Patented Feb. 5, 1946

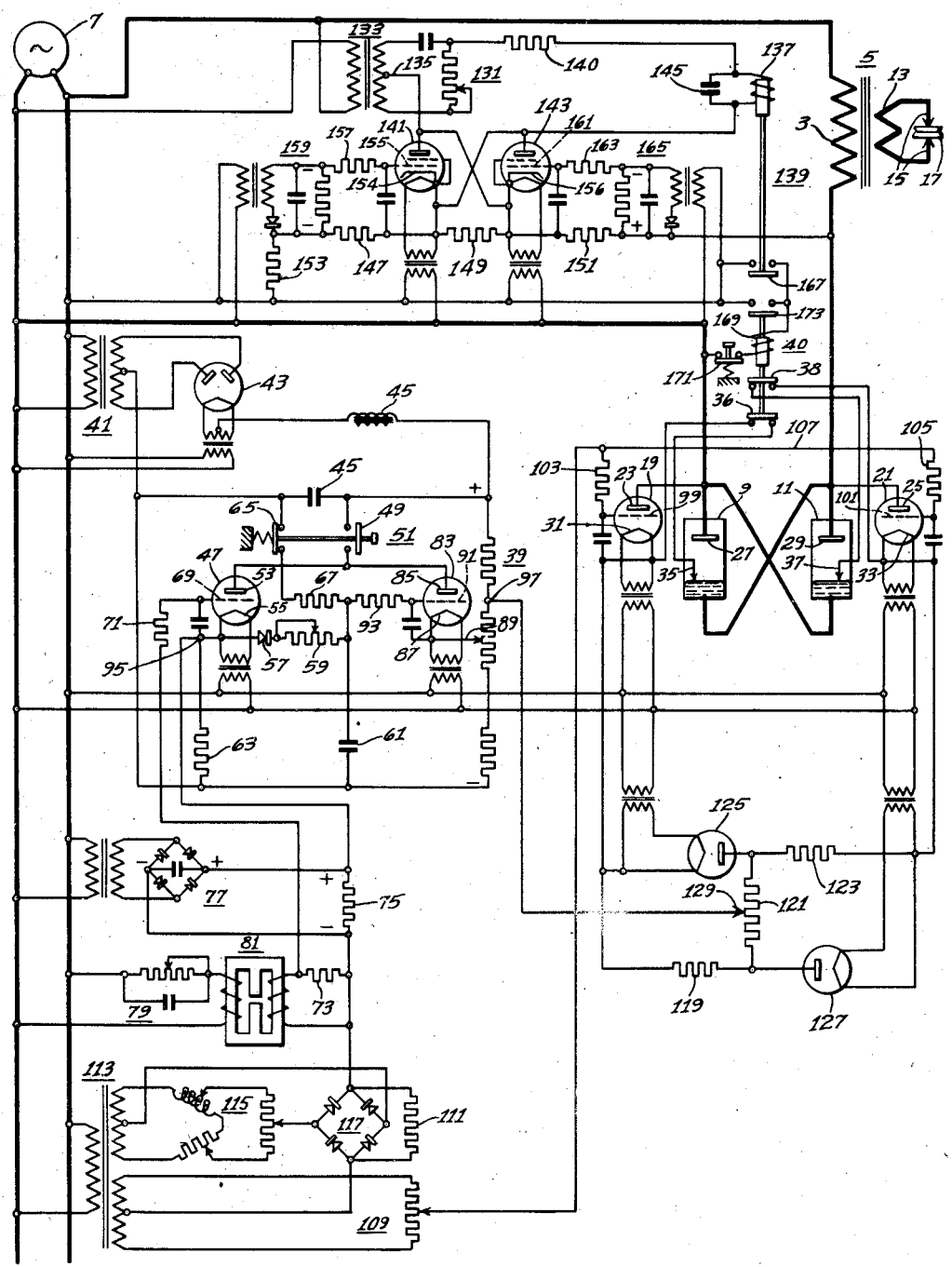

2,394,087

UNITED STATES PATENT OFFICE 2,394,087

ELECTRONIC CONTROL CIRCUITS

John R. Mahoney, Wilkinsburg, Pa., assignor to Westinghouse Electric Corporation, East Pittsburgh, Pa., a corporation of Pennsylvania Application February 2, 1943, Serial No. 474,481

16 Claims. (Cl. 175—294)

This invention relates to an electronic control circuit and has particular relation to a protective control circuit for use in a resistance welder.

In a resistance welder constructed in accordance with the teachings of the prior art, current is supplied to the welding transformer from an alternating current source through a pair of inversely connected ignitrons. A timing system is employed to render the ignitrons conductive alternately in opposite half-periods in a predetermined even number of half-periods of the source. The timing system also includes an adjustment whereby the instant in each half-period in which an ignitron is rendered conductive, may be preselected to determine the average current supplied to the welding transformer and thereby determine the heat developed at the weld. The adjustment in the usual welder may range from a 100% heat setting to a 20% heat setting.

The ignitrons used in a resistance welder have a comparatively long life. However, one of the ignitrons may be defective and become permanently conductive much earlier than expected, or the customer may desire to use each ignitron to the full extent of its life, in which case the ignitron may fail while the welder is in use. The ignitrons are often metallic tubes and are enclosed in a cabinet, so that there is no indication that a tube is permanently nonconductive prior to making a weld. If one of the ignitrons is permanently nonconductive, current is supplied to the welding transformer through the other ignitron in half-periods of one polarity only. Consequently, the current and heat required for a satisfactory weld are not provided.

A similarly unsatisfactory result is obtained if an ignitron fails to become conductive for any other reason, such as a defective ignition circuit. It is apparent that in any case a number of unsatisfactory welds may be produced upon the failure of one ignitron before the condition is discovered, or before it is discovered that a defective weld is being caused by the failure of an ignitron. Moreover, when only one ignitron conducts current, the transformer tends to become saturated so that the primary current may increase to such an extent before a weld is made that the circuit breakers are opened. Under such circumstances there is nothing to indicate where the defect lies.

It is accordingly an object of my invention to provide a novel control circuit for stopping the flow of welding current when such current is supplied only in half-periods of the same polarity.

It is another object of my invention to provide a novel control circuit for stopping the flow of welding current when such current is supplied only in half-periods of the same polarity and for preventing reoperation of the welder.

It is an additional object of my invention to provide a novel control circuit for stopping the flow of welding current when such current is being delivered only in half-periods of the same polarity, which is both rapid and reliable in operation.

More specifically, it is an object of my invention to provide a reliable control circuit for quickly stopping the supply of welding current upon the failure of one of the ignitrons when such current is supplied through a pair of inversely connected ignitrons.

In accordance with my invention an auxiliary source of alternating potential is provided to energize a work performing means. This work performing means may comprise a relay, which is responsive to the direct current component only of any current passing therethrough, arranged to open the ignition circuit of the ignitrons or operate any desired signalling or indicating device. Operation of the relay is controlled by a pair of inversely connected electric discharge valves of the arc-like type in circuit with the auxiliary potential source and the relay. The valves are preferably thyratrons and are normally biased to remain nonconductive. A potential proportional to the potential appearing across the primary of the welding transformer is impressed in the control circuit of each valve. The arrangement is such that one of the valves becomes conductive when power is supplied from the main source to the transformer in a half-period of the main source of one polarity; and the other valve becomes conductive when power is supplied from the source to the primary in a half-period of the opposite polarity. Therefore, as long as the ignitrons become conductive alternately in successive half-periods, the valves are likewise rendered conductive alternately and a balanced alternating current passes through the coil of the relay. As previously pointed out, an alternating current through the coil of the relay does not operate the relay. However, should power be delivered to the welding transformer primary only in half-periods of the same polarity because of a failure of one of the ignitrons or some other defect, a current having a direct current component of sufficient magnitude to operate the relay is supplied thereto. As a result, the relay is operated to effect opening of the ignition circuits of the ignitrons. Of course the relay may be employed to prevent further operation of the welder in other ways or to operate a signal or indicating device. The specific arrangement for opening the ignition circuits of the ignitrons includes means for maintaining the ignition circuits open until manual operation of a reset switch.

The auxiliary potential source is of the same frequency but is displaced in phase relative to the main source. The phase displacement is such that the anode-cathode potential of each valve lags behind the potential impressed in its control circuit which is proportional to that across the primary of the welding transformer. Because the instant in a half-period in which an ignitron is rendered conductive is adjusted to vary the welding heat, it is apparent that regardless of the particular instant selected, the current is supplied to the welding transformer in a portion of the half-period which includes the end of that half-period. Then by providing an auxiliary potential which lags behind the potential across the welding transformer primary, the variation in the average current supplied to the relay may be made very small compared to the variation in the average current supplied to the welding transformer over the entire range of heat settings. If the auxiliary potential lags the potential of the primary to a degree corresponding to the minimum heat setting, it follows that the average current supplied to the relay is substantially the same at all heat settings. Thus the many difficulties involved in attempting to provide a relay which could withstand great variations in current and potential is avoided.

There is still another important result obtained by employing the phase shifted auxiliary potential which is of particular advantage when the apparatus is set for less than 100% heat. Because of the inductance of the welding transformer, the polarity of the potential across the primary reverses when the primary current, as supplied through an ignitron, is decreasing and before the next ignitron is rendered conductive. This polarity change in an inductance is well known and is produced by the decay of flux in the transformer. The polarity change tends to render the next valve conductive. If this polarity change were permitted to render the next valve conductive, the control circuit could not distinguish between a supply of power from the main source to the primary in each half-period and the supply of power in alternate half-periods only under all heat settings. However, because the anode-cathode potentials of each valve lags behind the potential impressed in its control circuit in accordance with the primary potential, the potential caused by the decay of flux occurs while the anode-cathode potential of the next valve is negative and that valve cannot become conductive.

The novel features that I consider characteristic of my invention are set forth with particularity in the appended claims. The invention itself, however, both as to its organization and its method of operation, together with additional objects and advantages thereof, will be best embodied when read in connection with the accompanying drawing in which the single figure is a diagrammatic view of the specific embodiment.

The drawing illustrates the invention as applied to a resistance spot welding system, but it is to be understood that the invention may be similarly applied to a resistance seam welding system or to any other circuit where such protective or indicating means is desirable.

In the drawing, current is supplied to the primary 3 of a welding transformer 5 from a main source of alternating current 7 through a pair of inversely connected ignitrons 9 and 11. The secondary 13 of the welding transformer 5 is connected to a pair of welding electrodes 15 which engage the material 17 to be welded. A pair of electric discharge valves, 19 and 21 preferably thyratrons, which are hereafter designated as firing valves, are provided, one for each ignitron. The anodes 23 and 25 of the firing valves 19 and 21 are connected to the anodes 27 and 29 of the corresponding ignitrons 9 and 11. The cathodes 31 and 33 of the firing valves are connected to the igniters 35 and 37 of the ignitrons through contactors 36 and 38, respectively of a relay 40. When a firing valve is rendered conductive, current flows from the main source 7 flows therethrough and through the igniter and cathode of the corresponding ignitron to render the latter conductive.

A timing system is provided to render the ignitrons 9 and 11 conductive at the desired instants in each of a predetermined number of half-periods of the main source 7. The timing system includes a voltage divider 39 energized from the source through an auxiliary transformer 41, a rectifier 43 and filtering elements 45. An electric discharge valve 47 of the arc-like type, preferably a thyratron, which is hereinafter designated as a start valve, is connected between the positive and negative terminals of the divider 39 in a circuit extending from the positive terminal through a contactor 49 of a starting switch 51, the anode 53 and cathode 55 of the start valve 47, a rectifier 57, potentiometer 59 and capacitor 61 to the negative terminal. A resistor 63 is also connected between the cathode 55 of the start valve 47 and the negative terminal. A discharge circuit for the capacitor 61 is originally completed through a back contactor 65 on the starting switch 51 and a resistor 67. This discharge circuit is open when the contactor 49 of the starting switch 51 is closed.

The control circuit of the start valve 47 may be traced from the grid 69 thereof through a grid resistor 71 and a pair of resistors 73 and 75 to the cathode 55. A direct current potential derived from the source 7 through a full wave rectifier 77 appears across one of the resistors 75 and tends to maintain the start valve 47 nonconductive. A potential impulse tending to render the start valve 47 conductive is impressed across the other resistor 73 from the source 7 through a phase shifting circuit 79 and a peaking transformer 81. The instant at which the impulse occurs is determined by the setting of the phase shifting circuit 79 which is adjusted in accordance with the power factor of the system.

When the start valve 47 is rendered conductive, current flows therethrough to charge the capacitor 61 at a rate determined by the setting of the potentiometer 59 in circuit therewith. The capacitor 61 is also connected in the control circuit of another electric discharge valve 83 of the arc-like type, which is hereinafter designated as the stop valve. The anode 85 of the stop valve 83 is connected through the contactor 49 of the starting switch 51 to the positive terminal of the divider 39, and the cathode 87 is connected to an intermediate tap 89 on the divider 39. The control circuit of the stop valve 83 may then be traced from the grid 91, through a grid resistor 93, the capacitor 61, to the negative terminal of the divider 39 and from the intermediate tap 89 to the cathode 87. The potential impressed in the control circuit of the stop valve 83 from the divider 39 normally maintains the stop valve nonconductive. However, a predetermined time interval after the start valve 47 becomes conductive the potential across the capacitor 61 becomes sufficient to render the stop valve 83 conductive.

From the foregoing it is apparent that the junction point 95 of the resistor 63 and cathode 55 of the start valve 47 is originally highly negative with respect to another intermediate tap 97 on the voltage divider 39. When the start valve 47 becomes conductive, the junction point 95 is connected therethrough to the positive terminal of the divider 39 and consequently becomes slightly positive or less negative with respect to the intermediate tap 97. When the stop valve 83 becomes conductive a predetermined time thereafter, the junction point 95 is at substantially the same potential as the cathode 87 of the stop valve 83 and is therefore more negative with respect to the intermediate tap 97. The intermediate tap 97 is connected to the cathodes 31 and 33 of the firing valves 19 and 21 and the junction point 95 is connected to the grids 99 and 101 of the firing valves.

The grid 99 of one firing valve 19 is connected to the grid 101 of the other firing valve 21 through the respective grid resistors 103 and 105 and interconnecting conductor 107. The interconnecting conductor 107 is connected to the junction point 95 between the resistor 63 and cathode 55 of the start valve 47 through a balance potentiometer 109 and resistors 111 and 75. The constant negative potential on resistor 75 is of course added to the potential between point 95 and tap 97.

As inverted rectified alternating potential is impressed across the resistor 111 from the source 7 through an auxiliary transformer 113, a phase shifting circuit 115 and a rectifier 117. It then becomes apparent that the resultant potential between the grids and cathodes of the firing valves 19 and 21, respectively, takes the general form of an inverted rectified alternating potential superimposed on a direct current potential. Originally the resultant potential is too negative to rise above the critical value necessary to render the firing valves conductive. When the start valve 47 becomes conductive, the resultant potential becomes less negative so that the peaks of the resultant potential rise above the critical value and render one or the other of the firing valves conductive at an instant in each half-period determined by the setting of the phase shifting circuit 115. If the ignitrons 9 and 11 should have slightly different ignition characteristics, the balance potentiometer 109 may be adjusted to change the relative elevation of successive peaks of the resultant potential to effect ignition of the ignitrons at the same relative instant in each half-period.

First, second and third resistors 119, 121 and 123 are connected in the order named between the cathodes 31 and 33 of the firing valves 19 and 21. A glow tube rectifier 125 is connected across the first and second resistors 119 and 121 in a direction to conduct current away from the junction of the second and third resistors 121 and 123. Another glow tube rectifier 127 is connected across the second and third resistors 121 and 123 to conduct current from the junction of the first and second resistors 119 and 121. This particular arrangement is described in the copending application of Donald P. Faulk, Serial No. 463,989, filed October 30, 1942, and assigned to Westinghouse Electric & Manufacturing Company. Its purpose is to nullify the effects of the alternating potential which tends to appear across the resistors 119, 121 and 123 from their connection through the igniter 35 and 37 to the source. The intermediate tap 97 on the voltage divider 39 is connected to a center tap 129 on the second resistor and thence through half of the second resistor 121 and either the first or second resistor as the case may be to the cathodes of the firing valves. If the rectifiers 125 and 127 remain nonconductive, the alternating potential appearing across half of the second resistor and either the first or third resistor, as the case might be, is superimposed upon the control potential derived from the remainder of the system, and produces such a disturbance therein that control of the firing valves is disrupted. However, when the anode-cathode potential of one of the firing valves 19 is positive, the potential across the three resistors 119, 121, 123 has such a polarity that the rectifier 125 connected to the cathode 31 of that firing valve 19 is rendered conductive. As a result the magnitude of the alternating potential appearing across the two resistors 119 and 121 shorted by the rectifier 125 is considerably reduced, so that it does not disturb the application of the control potential to the firing valve 19. Rectifier 127 operates in a similar manner with respect to valve 21.

To initiate operation of the welding system, the starting switch contactor 49 is closed. The start valve 47 becomes conductive and thereafter the ignitrons 9 and 11 are rendered conductive alternately in opposite half-periods of the source at an instant in each half-period, depending upon the setting of the heat control phase shifting circuit 115. After a predetermined interval of time, the stop valve 83 becomes conductive and the ignitrons 9 and 11 are not again rendered conductive until the starting switch 51 is released and then reclosed. The length of the time interval is ordinarily set so that an even number of half-periods of welding current is supplied.

Should one of the ignitrons fail to conduct so that the welding current is supplied to the welding transformer only during alternate half-periods, a control circuit becomes effective to operate the relay 40 and open the contactors 36 and 38 in the ignition circuits of the ignitrons. The control circuit includes an auxiliary source 131 of potential comprising an auxiliary transformer 133 energized from the main source 7 and a phase shifting circuit 135. The coil 137 of a relay 139 is connected in circuit with the auxiliary source 131 through a limiting resistor 140 and a pair of inversely connected electric discharge valves 141 and 143 of the arc-like type, preferably thyratrons. The relay 139 is of the type which is responsive to the direct current component only of any current passing through its coil. In other words, the relay 139 ignores a balanced alternating current but is operated by the application thereto of a direct current or of an unbalanced pulsating current having a direct current component above a predetermined magnitude.

A capacitor 145 may be connected across the coil 137 of the relay 139. The dimensions of the capacitor should be such that the impedance thereof relative to that of the coil is high to a direct current and low to an alternating current. Thus the capacitor aids the relay in its exclusion of an alternating current as an operating force. In addition the capacitor tends to continue current flow through the relay in the same direction at the end of a half-period when current is not supplied thereto from the auxiliary source in a succeeding half-period. In this manner the capacitor tends to speed up operation of the relay.

A first, second and third impedance means, illustrated here as resistors 147, 149, 151, are connected through another resistor 153 across the primary 3 of the welding transformer 5. Consequently, a potential appears across each of these resistors which is proportional to the potential across the primary. The cathode 154 of the first valve 141 is also connected to the junction point of the first and second resistors 147 and 149, and the cathode 156 of the second valve 143 is connected to the junction point of the second resistor 149 and third resistor 151. It then becomes apparent that a circuit is completed from one side of the source 131 through the limiting resistor 140, the coil of the relay 139 and capacitor 145, and the resistor 149 to the other side of the source. As a result, a small alternating current is supplied through the coil 137 of the relay. By virtue of the connections previously described, if either of the valves 141 or 143 becomes conductive, it short circuits the resistor 149 so that a considerably greater current is supplied through the coil 137 of the relay. Thus, the valves 141 and 143 in effect control the flow of current through the coil 137.

The control circuit of the first valve 141 may be traced from its grid 155, through a grid resistor 157, a source of biasing potential 159, and the first resistor 147 to the cathode 154. The biasing potential 159 tends to maintain the first valve 141 nonconductive. However, the potential appearing across the first resistor 147 when the potential across the primary 3 is of one polarity counteracts the biasing potential 159 and tends to render the first valve 141 conductive. The auxiliary potential of source 131 is displaced in phase relative to the main source 7 so that the anode-cathode potential of the first valve 141 lags behind the potential appearing across the first resistor 147. If the degree of phase shift of the auxiliary potential corresponds to the minimum possible setting of the heat control, the first valve 141 conducts a complete half-period of the auxiliary potential regardless of the heat control setting.

The control circuit of the second valve 143 may be traced from its grid 161, through a grid resistor 163, another source of biasing potential 165, and the third resistor 151, to the cathode 156. The second valve 143 operates in a manner similar to the first valve 141 but in the opposite half-period of the auxiliary potential.

As long as welding current is supplied to the primary 3 in successive half-periods of the main source 7, a balanced alternating current is supplied through the coil 137 of the relay 139. If one of the ignitrons 9 or 11 fails to conduct, one of the valves 141 or 143 likewise fails to conduct and a pulsating current made up of the large current flowing through the valve which does conduct in one half-period of the auxiliary potential, followed by the very small current supplied to the coil 137 through the second resistor 149 in the succeeding half-period. The direct current component of this pulsating potential operates the relay 139, closing its contactor 167. The contactor 167 completes a circuit from the source 7 through the coil 169 of the other relay 40 and a normally closed reset switch 171. The other relay 40 is energized and its contactors 36 and 38 open the ignition circuits of the ignitrons 9 and 11 preventing further firing thereof. A back contact 173 of the relay 40 closes a holding circuit so that the relay 40 remains energized until the reset switch 171 is manually opened.

Although it is preferable to displace the phase of the auxiliary potential to the extent necessary to insure passage of a complete half-period of current by each of the valves 141 and 143, the degree of phase shift need only be sufficient to satisfy two conditions. The first of these conditions is that a large enough portion of a half-period of current is supplied to the coil 137 with a minimum heat control setting to insure operation thereof while avoiding an excessive current at a maximum heat setting. These limits are, of course, determined by the nature of the relay itself.

The other feature which must be considered in determining the degree of displacement of the phase of the auxiliary potential relates to the reactive characteristics of the transformer primary 3. When current is supplied to the primary in less than complete half-periods, the decay of flux in the transformer near the end of a half-period of the source causes a potential of opposite polarity to appear across the primary. This potential also appears across the first, second and third resistors 147, 149 and 151. If the auxiliary potential were not displaced in phase, the potential across the resistors 147, 149 and 151 caused by the decay of flux in the primary would render the next valve conductive in a manner similar to that effected by a supply of power from the source 7 in the next half-period. However, when the auxiliary potential is sufficiently displaced in phase, the potential resulting from the decay of flux occurs while the anode-cathode potential of the next valve is still negative so that it is not rendered conductive.

In a system constructed in accordance with the circuit shown in the drawing, the valves 141 and 143 are Westinghouse thyratrons WL-630. The first and third resistors 147 and 151 have a resistance of 50,000 ohms while the second resistor 149 has a resistance of 20,000 ohms. The sources 159 and 165 of biasing potential in the control circuits of the valves 141 and 143 provide approximately 20 volts biasing potential. For a 200 to 260-volt main source potential, the other resistor 153 in the circuit across the welding transformer primary 3 has a resistance of 750,000 ohms. The grid resistors 157 and 163 have a resistance of 250,000 ohms, and the limiting resistor 140 in circuit with the auxiliary source and relay has a resistance of 3,000 ohms. The relay 139 is a C. P. Clare relay #1228718–A5961-38 EC—28,600 turns—3,000 ohms, and the capacitor 145 connected across the relay has a capacity of .5 microfarad.

Although I have shown and described a specific embodiment of my invention, I am aware that many modifications thereof are possible. My invention, therefore, is not intended to be restricted to the embodiment illustrated.

I claim as my invention:

1. A control circuit for use with a system for supplying power to a load from a main alternating current source in a selected portion of each half-period thereof which includes the end of said half-period, comprising means adapted to form an auxiliary source of alternating potential of the same frequency but lagging in phase relative to said main source, work performing means responsive to the direct current component of any current flowing therethrough, valve means in circuit with said auxiliary source and work means for controlling the flow of current through said work means, and means associated with said valve means and responsive to the potential across said load in each half-period of said main source in which power is supplied therefrom to said load for causing said valve means to be conductive in a half-period of said auxiliary source of a polarity corresponding to the polarity of said half-period of the main source.

2. A control circuit for use with a system for supplying power to a load from a main alternating current source, comprising work performing means responsive to the direct current component of any current flowing therethrough, valve means in series circuit with said work means for controlling the flow of current therethrough, means for impressing an auxiliary alternating potential of the same frequency as said source in circuit across said series connected work means and valve means, control means connected to said valve means to cause said valve means to be conductive in a half-period of said auxiliary potential of one polarity when a potential of a corresponding polarity is impressed upon said control means during that half-period of one polarity and in a half-period of said auxiliary potential of opposite polarity when a potential of opposite polarity is impressed upon said control means during that half-period of opposite polarity, and means connected to said control means and effective in response to a potential across said load for impressing on said control means a potential corresponding in polarity to the potential across said load.

3. A control circuit for use with a system for supplying power to a load from a main alternating current source in a selected portion of each half-period thereof which includes the end of said half-period, comprising means adapted to form an auxiliary source of alternating potential of the same frequency but lagging in phase relative to said main source, work performing means responsive to the direct current component of any current flowing therethrough connected to said auxiliary source, valve means in circuit with said auxiliary source and work means for controlling the flow of current through said work means, control means connected to said valve means to cause said valve means to be conductive in a half-period of said auxiliary source of one polarity when a potential of a corresponding polarity is impressed upon said control means during that half-period of one polarity and in a half-period of said auxiliary source of opposite polarity when a potential of opposite polarity is impressed upon said control means during that half-period of opposite polarity, and means connected to said control means and effective in response to a potential across said load for impressing on said control means a potential corresponding in polarity to the potential across said load.

4. A control circuit for use with a system for supplying power to a reactive load from a main alternating current source in a selected portion of each half-period thereof which includes the end of said half-period, comprising means adapted to form an auxiliary source of alternating potential of the same frequency but lagging in phase relative to said main source, work performing means responsive to the direct current component of any current flowing therethrough connected to said auxiliary source, valve means in circuit with said auxiliary source and work means for controlling the flow of current through said work means, control means connected to said valve means to cause said valve means to be conductive in a half-period of said auxiliary source of one polarity when a potential of a corresponding polarity is impressed upon said control means during that half-period of one polarity and in a half-period of said auxiliary source of opposite polarity when a potential of opposite polarity is impressed upon said control means during that half-period of opposite polarity, and means connected to said control means and effective in response to a potential across said load for impressing on said control means a potential corresponding in polarity to the potential across said reactive load, the degree of lag of said auxiliary potential phase being sufficient to prevent said valve means from being conductive in response to a potential across said reactive load resulting from a decay of flux therein.

5. A control circuit for use with a system for supplying power to a load from a main alternating current source in a selected portion less than the whole of each half-period thereof which includes the end of said half-period, comprising means adapted to form an auxiliary source of alternating potential of the same frequency but lagging in phase relative to said main source, a relay of the type which is responsive to the direct current component only of any current flowing therethrough connected to said auxiliary source, electric discharge valve means of the arc-like type interposed between said auxiliary source and relay for controlling the flow of current through said relay, control means connected to said valve means to cause same to become conductive in a half-period of said auxiliary source of one polarity when a potential of a corresponding polarity is impressed upon said control means during that half-period of one polarity and in a half-period of said auxiliary source of opposite polarity when a potential of opposite polarity is impressed upon said control means during that half-period of opposite polarity, and means connected to said control means and effective in response to a potential across said load for impressing on said control means a potential corresponding in polarity to the potential across said load, the degree of lag of said auxiliary potential phase being such that said valve means are conductive for a substantially complete half-period of said auxiliary source for each half-period of said main source in which power is supplied to said load.

6. A control circuit for use with a system for supplying power to a load from a main alternating current source in a selected portion of each half-period thereof which includes the end of said half-period, comprising means adapted to form an auxiliary source of alternating potential of the same frequency but lagging in phase relative to said main source, work performing means responsive to the direct current component of any current flowing therethrough connected to said auxiliary source, electric discharge valve means of the arc-like type in circuit with said auxiliary source and work means for controlling the flow of current through said work means, and means associated with said valve means and responsive to the potential across said load in each half-period of said main source in which power is supplied therefrom to said load for causing said valve means to be rendered conductive in a half-period of said auxiliary source of a polarity corresponding to the polarity of said half-period of the main source.

7. A control circuit for use with a system for supplying power to a load from a main alternating current source, comprising means adapted to form an auxiliary source of alternating potential of the same frequency as said main source, an impedance means, work performing means connected in series with said impedance means and auxiliary source and responsive to the direct current component of any current flowing therethrough, electric discharge valve means of the arc-like type connected across said impedance means, and means associated with said valve means and responsive to the potential across said load in each half-period of said main source in which power is supplied therefrom to said load for causing said valve means to be rendered conductive in a half-period of said auxiliary source of a polarity corresponding to the polarity of said half-period of the main source.

8. A control circuit for use with a system for supplying power to a load from a main alternating current source in a selected portion of each half-period thereof which includes the end of said half-period, comprising means adapted to form an auxiliary source of alternating potential of the same frequency but lagging in phase relative to said main source, work performing means responsive to the direct current component of any current flowing therethrough connected to said auxiliary source, a pair of inversely connected electric discharge valves of the arc-like type in circuit with said work means and auxiliary source for controlling the flow of current through said work means, first control means connected to said first valve for causing it to become conductive in a half-period of said auxiliary source of one polarity when a potential of a corresponding polarity is impressed upon said first control means during that half-period of one polarity, second control means connected to said second valve for causing it to become conductive in a half-period of said auxiliary source of the opposite polarity when a potential of opposite polarity is impressed upon said second control means during that half-period of opposite polarity, and means connected to said first and second control means effective in response to a potential of said one polarity across said load for impressing a potential of a corresponding polarity on said first control means and effective in response to a potential of said opposite polarity across said load for impressing a potential of said opposite polarity on said second control means.

9. A control circuit for use with a system for supplying power to a load from a main source of alternating current in a selected portion of each half-period thereof which includes the end of said half-period, comprising means adapted to form an auxiliary source of alternating potential of the same frequency but lagging in phase relative to said main source, an impedance means, work performing means connected in series with said impedance means and auxiliary source and responsive to the direct current component of any current flowing therethrough, a pair of electric discharge valves of the arc-like type connected inversely across said impedance means, first control means connected to the first of said valves for causing it to become conductive in a half-period of said auxiliary source of one polarity when a potential of a corresponding polarity is impressed upon said first control means during that half-period of one polarity, second control means connected to said second valve for causing it to become conductive in a half-period of said auxiliary source of the opposite polarity when a potential of opposite polarity is impressed upon said second control means during that half-period of opposite polarity, and means connected to said first and second control means effective in response to a potential of said one polarity across said load for impressing a potential of a corresponding polarity on said first control means and effective in response to a potential of said opposite polarity across said load for impressing a potential of said opposite polarity on said second control means.

10. A control circuit for use with a system for supplying power to a reactive load from a main alternating current source in a selected portion of each half-period thereof which includes the end of said half-period, comprising means adapted to form an auxiliary source of alternating potential of the same frequency but lagging in phase relative to said main source, work performing means responsive to the direct current component of any current flowing therethrough connected to said auxiliary source, a pair of inversely connected electric discharge valves of the arc-like type in circuit with said work means and auxiliary source for controlling the flow of current through said work means, first control means connected to the first of said valves for causing it to become conductive in a half-period of said auxiliary source of one polarity when a potential of a corresponding polarity is impressed upon said first control means during that half-period of one polarity, second control means connected to said second valve for causing it to become conductive in a half-period of said auxiliary source of the opposite polarity when a potential of opposite polarity is impressed upon said second control means during that half-period of opposite polarity, and means connected to said first and second control means effective in response to a potential of said one polarity across said load for impressing a potential of a corresponding polarity on said first control means and effective in response to a potential of said opposite polarity across said load for impressing a potential of said opposite polarity on said second control means, the degree of lag in phase of said auxiliary potential being sufficient to prevent said valves from becoming conductive in response to a potential across said reactive load resulting from a decay of flux therein.

11. A control circuit for use with a system for supplying current to a load from a main alternating current source in a selected portion of each half-period which includes the end of said half-period, comprising means adapted to form an auxiliary source of alternating potential of the same frequency but lagging in phase relative to said main source, a relay of the type which is responsive to the direct current component only of any current passing therethrough connected to said auxiliary source, a capacitor connected across said relay which has such dimensions that the impedance of said capacitor relative to that of said relay is low toward an alternating current but high towards a direct current, valve means in circuit with said relay and auxiliary source for controlling the flow of current through said relay, control means connected to said valve means to cause said valve means to be conductive in a half-period of said auxiliary source of one polarity when a potential of a corresponding polarity is impressed upon said control means during that half-period of one polarity and in a half-period of said auxiliary source of opposite polarity when a potential of opposite polarity is impressed upon said control means during that half-period of opposite polarity, and means connected to said control means and effective in response to a potential across said load for impressing on said control means a potential corresponding in polarity to the potential across said load.

12. For use in supplying current from a main alternating current source to a load, the combination comprising first control means interposed between said source and load to permit a flow of current to said load only in a selected portion of each half-period of said main source which includes the end of said half-period, means adapted to form an auxiliary source of alternating potential, a control device connected to said auxiliary source and operable upon the passage therethrough of a current having a direct current component above a predetermined magnitude to prevent said first control means from permitting a flow of current to said load, valve means in circuit with said second control device and auxiliary source for controlling the flow of current through said second control device, second control means connected to said valve means to cause said valve means to be conductive in a half-period of said auxiliary source of one polarity when a potential of corresponding polarity is impressed upon said second means during said half-period of one polarity and in a half-period of said auxiliary source of opposite polarity when a potential of opposite polarity is impressed upon said second means during said half-period of opposite polarity, and means connected to said second control means and effective in response to a potential across said load for impressing on said control means a potential corresponding in polarity to the potential across said load; said auxiliary potential being of the same frequency but lagging in phase relative to said main source.

13. Apparatus according to claim 12 in which said first control means comprising a pair of inversely connected ignitrons between said main source and load and a timing system for rendering one or the other of said ignitrons conductive at a preselected instant in each half-period of said main source, and said control device comprises a relay which is operable only in response to current having a direct current component above a predetermined magnitude connected to said auxiliary source and valve means, and is effective when operated to prevent said ignitrons from being rendered conductive by said timing means.

14. A control circuit for use with a system for supplying current to a reactive load from a main alternating current source in a selected portion of each half-period which includes the end of said half-period, comprising means adapted to form an auxiliary source of alternating potential, work performing means responsive to the direct current component of any current passing therethrough connected to said auxiliary source, first, second and third impedance means connected in series in the order named across said load, said second impedance means also being connected in series with said work means and auxiliary source, a pair of inversely connected electric discharge valves of the arc-like type, each having an anode and cathode in circuit across said second resistor and a control electrode, a first source of biasing potential connected between the control electrode of the first valve, the cathode of which is connected to the junction of said first and second impedance means, and the other end of said first impedance means, a second source of biasing potential connected between the control electrode of the second valve and the end of said third impedance means opposite the junction of said third and second impedance means, whereby the potential across said first impedance means counteracts said first biasing potential when the potential across said load is of one polarity and the potential across said third impedance means counteracts said second biasing potential when the potential across said load is of the opposite polarity, said auxiliary potential being of the same frequency but displaced in phase relative to said main source so that the anode-cathode potentials of said first and second valves lags in phase behind the potentials of said first and third impedance means respectively.

15. A control circuit for use with a system for supplying power to a load from a main alternating current source in a selected portion of each half-period thereof which includes the end of said half-period, comprising work performing means responsive to the direct current component of any current flowing therethrough, valve means in circuit with said work means for controlling the flow of current therethrough, means for impressing a first alternating potential in circuit across said valve means and work means, control means connected to said valve means to cause said valve means to be conductive in a half-period of said first potential of one polarity when a potential of a corresponding polarity is impressed upon said control means during that half-period of one polarity, and in a half-period of said first potential of opposite polarity is impressed upon said control means during that half-period of opposite polarity, and means connected to said control means and effective in response to a potential across said load for impressing on said control means a second potential corresponding in polarity to the potential across said load, said first and second potentials being displaced in phase relative to each other with said first potential lagging behind said second potential.

16. A control circuit for use with a system for supplying power to a load from a main alternating current source in a portion of each half-period thereof which includes the end of said half-period, the length of said portion being adjustable over a predetermined range, comprising means adapted to form an auxiliary source of alternating potential of the same frequency but lagging in phase relative to said main source, work performing means responsive to the direct current component of any current flowing therethrough connected to said auxiliary source, a pair of inversely connected electric discharge valves of the arc-like type in circuit with said work means and auxiliary source for controlling the flow of current through said work means, first control means connected to the first of said valves for causing it to become conductive in a half-period of said auxiliary source of the opposite polarity when a potential of opposite polarity is impressed upon said second control means during that half-period of opposite polarity, and means connected to said first and second control means effective in response to a potential of said one polarity across said load for impressing a potential of a corresponding polarity on said first control means and effective in response to a potential of said opposite polarity across said load for impressing a potential of said opposite polarity on said second control means, the degree of lag in phase of said auxiliary potential being sufficient to permit each of said valves to be conductive for a substantially complete half-period of said auxiliary potential for each half-period of the corresponding polarity of said main source in a portion of which power is supplied to said load, over the entire range of adjustment of the length of said portion.

JOHN R. MAHONEY.